United States Patent
Woontner

(10) Patent No.: US 6,835,948 B2
(45) Date of Patent: Dec. 28, 2004

(54) HOLOGRAPHIC OR OPTICALLY VARIABLE PRINTING MATERIAL AND METHOD FOR CUSTOMIZED PRINTING

(75) Inventor: Marc O. Woontner, Ocean Port, NJ (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 10/605,139

(22) Filed: Sep. 10, 2003

(65) Prior Publication Data

US 2004/0101982 A1 May 27, 2004

Related U.S. Application Data

(60) Provisional application No. 60/319,541, filed on Sep. 10, 2002.

(51) Int. Cl.[7] ..................... H01L 29/06; H01L 31/0328; H01L 31/0336; H01L 31/072; H01L 31/109
(52) U.S. Cl. .......................................... 257/21; 257/22
(58) Field of Search ..................... 257/21, 22; 359/1–3, 359/22, 24

(56) References Cited

U.S. PATENT DOCUMENTS

| | | | |
|---|---|---|---|
| 4,072,098 A | 2/1978 | Granzow et al. | |
| 4,415,225 A | 11/1983 | Benton et al. | 350/3.84 |
| 4,856,857 A | 8/1989 | Takeuchi et al. | 350/3.6 |
| 5,262,879 A | 11/1993 | Davis | 359/10 |
| 5,342,672 A | 8/1994 | Killey | 428/195 |
| 5,351,142 A | 9/1994 | Cueli | 359/2 |
| 5,382,965 A | 1/1995 | Yamakawa et al. | 346/76 PH |
| 5,513,019 A | 4/1996 | Cueli | 359/2 |
| 5,781,316 A | 7/1998 | Strahl et al. | |
| 5,822,092 A | 10/1998 | Davis | 359/10 |
| 6,388,780 B1 | 5/2002 | Monaghan et al. | 359/35 |

FOREIGN PATENT DOCUMENTS

| | | |
|---|---|---|
| DE | 44 31 531 A1 | 3/1996 |
| EP | 0 060 641 A2 | 3/1982 |
| EP | 0 467 601 A2 | 1/1992 |
| JP | 5-289599 | 5/1993 |
| JP | 9-311616 | 12/1997 |
| JP | 2000-177281 | 6/2000 |
| JP | 2000-211257 | 8/2000 |
| JP | 2000-272276 | 10/2000 |

Primary Examiner—Thien F Tran
(74) Attorney, Agent, or Firm—Houston Eliseeva LLP

(57) ABSTRACT

A transfer recording material allowing the production of customized holographic images is described. The transfer recording material comprises a multilayer structure on a carrier forming a plurality of panels. A portion of the multilayer structure corresponding to a panel comprises an embossable layer (holographic layer) wherein each pixel is configured to reflect incoming light at a predetermined angle $\alpha_1$. Each pixel corresponding to the embossable layer of an adjacent panel is configured to reflect incoming light at a different predetermined angle $\alpha_2$. The transfer recording material can have as many panels as desired by a particular application, each of the layers having an embossable layer with pixels configured to reflect incoming light at a certain angle $\alpha$. The transfer material is therefore formed by a plurality of spaced-apart panels each of which comprises an embossable holographic layer reflecting light at a predetermined angle different from that of other panels. Upon activation of a surface of a printer head, pixels from different panels transfer onto a substrate, forming a desired customized holographic design.

19 Claims, 4 Drawing Sheets

HOLOGRAPHIC OR OPTICALLY VARIABLE PRINTING MATERIAL AND METHOD FOR CUSTOMIZED PRINTING

CROSS REFERENCE TO RELATED APPLICATIONS

This application claims the benefit of U.S. Provisional patent application No. 60/319,541, filed on Sep. 10, 2002, which is incorporated herein by reference.

BACKGROUND OF INVENTION

The present invention relates to the field of holographic or optically variable media, a method of providing holographic or optically variable media, and a method for forming holograms or optically variable images on a substrate. More particularly, a multilayered holographic or optically variable material comprising a plurality of embossed panels is provided to print an individually customized holographic or optically variable image onto a substrate by transferring pixels from one or more panels onto the substrate.

Holography or optically variable images have been used in the applications when it is desirable to reproduce the appearance of a one, two or three-dimensional images on various substrates. Reflective transparent, semitransparent, and opaque materials containing embossed holographic images can be used in decorative and security applications. One of the applications of thin films containing holographic or optically variable images is document protection, such as passports, credit cards, security passes, licenses, stamps and the like. Protection is achieved by affixing holographic or optically variable films to the documents, therefore making it very difficult to forge and counterfeit such documents.

An example of a holographic or optically variable film can be found in U.S. Pat. No. 5,781,316 to Strahl et al., which teaches applying a semi-transparent holographic or optically variable transfer foil film to a substrate, such as a security device. The film described in that patent comprises a thermally stable carrier for supporting multiple thermoplastic or thermoset layers. A heat sensitive release layer is applied to the carrier to enable separation of the carrier from the multiple layers of coatings. A wear-resistant transparent topcoat is applied over the release layer to act as an outer surface for the holographic film. The topcoat may be treated or cured in order to increase its tenacity. An embossable layer applied over the topcoat is adapted to retain the impression of an embossed holographic image. A semi-transparent reflective layer of ZnS is applied over the embossable layer for reflecting the embossed holographic or optically variable image and enabling a viewer to see the holographic or optically variable indicia transferred onto the substrate or document. A surface relief pattern is impressed within the reflective layer and the embossable layer to form the embossed holographic or optically variable image. Adhesive and primer or tie layers are also applied for adhering the semi-transparent holographic coating to the substrate.

Although the method described in that patent works to reduce the possibility of forgery of a security document such as an ID card, some risk of forgery or counterfeiting continues to exist. To improve the security of a paper document or a plastic card, a more personalized security hologram or optically variable image may be desirable. Thermal transfer printing is one way of recording and printing variable personalized information on various substrates. A more complex holographic or optically variable image can be created using thermal transfer printers and thermal transfer ribbons, as described in U.S. Pat. No. 5,342,672 to Killey. However, the hologram described in that patent is opaque and therefore not suitable for application on an ID card or other security documents where the personalized individual data needs to be protected from alteration. Accordingly, there is a need for a semi-transparent holographic thermal transfer recording material, which can be applied onto various documents in a individually customized manner for protection and counterfeit prevention purposes.

To print an image by thermal transfer printing using an ink ribbon, the print head of the printer contacts the polymer (or dye diffusion) ribbon and transfers ink to particular locations on the surface of a print medium. The printer head thermally activates the predetermined combinations of heating elements, which are adjacent to the image-forming locations. The ink/carrier structure is locally heated by the heating elements to a temperature at or above the melting point of the ink. In this manner, the necessary amount of ink softens and adheres to the print medium at the predetermined locations to form the image.

Color images are printed with an ink/carrier structure, such as a ribbon, that includes separate regions or panels of differently colored inks, such as the subtractive primary colors, yellow, magenta, and cyan. Color printing is accomplished by sequentially passing the print head along the ribbon, each pass selectively transferring different colored inks to the desired locations on the substrate at predetermined times. Thermal printing ribbons are available with a single black panel, three color panels (yellow, magenta, and cyan), or four color panels, (yellow, magenta, cyan, and black). Such thermal printing process allows a user to create a highly customized color picture or image on the substrate.

It would be desirable to provide a holographic or optically variable printing material and a method for printing or transferring individually customized holographic or optically variable images from the holographic or optically variable transfer material, such as a ribbon, to a substrate.

SUMMARY OF INVENTION

The present invention is a holographic or optically variable transfer material for application to a substrate, such as a document or device. The first side of the material comprises a thermally stable carrier such as PET, for supporting multiple thermoplastic or thermoset coatings or layers. A release layer is the first layer applied to the carrier to facilitate separation of the carrier from the multiple layers when they are subjected to heat from the thermal print head. A wear resistance topcoat may then be applied over the release layer to serve as the outer surface of the hologram or optically variable image. An embossable layer is applied over the topcoat. A semi-transparent reflective layer of ZnS or possibly Aluminum in the case of a opaque security image is applied over the embossable layer. A tie or primer coating and heat activated adhesive layer are the layers providing the adherence of the transferable holographic material to the chosen substrate. The "embossment" pressed into the embossable layer consists of consecutive sections or panels. Each of the panels is configured in such a way that it reflects incoming light at a certain distinct angle of reflection. A panel reflecting at a predetermined angle can be made by either embossing the panel to reflect at the predetermined holographic reflective angle (using a conventional holographic table), or by digitally creating the optically variable panel by embossing it from a plate or shim produced in a pixel-by-pixel manner (for example, by using a computer controlled origination machine like the Davis Light Machine). Using the latter method, each panel of the present invention comprises the pixels that can later be transferred onto the substrate in the process of forming a customized holographic or optically variable image. All pixels disposed in a particular panel reflect incoming light at the same angle, which angle is different from the angle at which incoming light is reflected by all pixels disposed in another panel. Similarly, if each panel comprises an embossment of a holographically reflective or optically variable angle, then each panel of the present invention will reflect incoming light at a distinct predetermined angle of reflection.

A eye-mark or registration bar to position each panel for registered printing can be provided on either the coated side or the carrier side of the product. The carrier side of the holographic or optically variable transfer material can also include coatings which eliminate blocking of the coatings as well as increase the "slip" of the transfer material against the thermal head of a printer.

Using the material and method of transferring of a holographic or optically variable image described above, a personalized or customized holographic or optically variable image can be printed on a substrate by sequentially passing the holographic or optically variable transfer material, such as a ribbon, past the thermal print head of a thermal transfer printer. Each such pass will selectively transfer the material in a pixel-by-pixel manner, or other selective pixel manner, from different panels, so that a custom image analogous to a "conventually produced optically variable image" can be printed on a substrate. For example, the transfer process can involve selectively transferring all the image forming pixels from the panel reflecting at angle $\alpha_1$, then selectively transferring all the image forming pixels from the panels reflecting at angle $\alpha_2$, and so on as many times as required by the structure of the image or a certain application or program.

DETAILED DESCRIPTION

Figure 1:
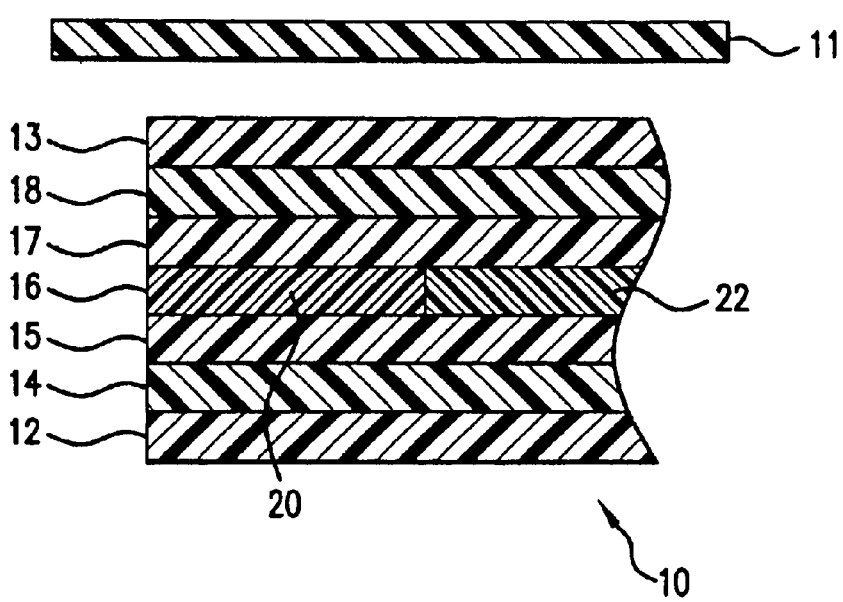
FIG. 1 is a cross-sectional view of the material of the present invention.

Shown in FIG. 1 is a cross-section of a transfer material 10 containing holographically or optically variable embossed panels 20 and 22 according to the present invention. Alternatively, panels 20 and 22 can be provided digitally as described in the Summary section of this description. In a particular embodiment illustrated in FIG. 1, transfer material 10 is a film or a ribbon. Material 10 comprises multiple layers, which are applied during various stages of the manufacturing process. A thermally stable layer 12 can be made of polyester or any other suitable thermally stable material onto which other layers can be deposited. A release layer 14 is disposed on thermally stable layer 12 to later separate layer 12 from other layers. Release layer 14 typically comprises a wax or any other suitable thermoplastic material, which softens at a certain temperature and allows the thermally stable layer 12 to be removed or released upon thermal activation of layer 14.

A wear resistant layer called a top coat 15 is applied on top of release layer 14 to act as the top layer of material 10, once thermally stable layer 12 and release layer 14 are removed. Wear resistant layer 15 is preferably transparent, but it is also contemplated that it can be tinted to better display a holographic or optically variable image embossed in material 10. Wear resistant layer 15 can be made of urethane, acrylic, vinyl or any other tear, mar, scratch and wear or chemical resistant material. Deposition of wear resistant layer 15 is typically performed via coating, casting, laminating or other known method, depending on the desired thickness. Wear resistant layer 15 can be applied by means of gravure, reverse roller, mayer bar, coextrusion or lamination, and can be treated by means of an electron beam in order to change the properties of the layer. It also can be air dried, heat set, UV cured or laminated in order to acquire tenacity.

An embossable layer 16 is next applied over wear resistant layer 15. Embossable layer 16 is preferably made of a thermoplastic resin comprised of urethane or any other suitable material. Embossable layer 16 is an impressionable layer, which effectively has a memory to retain the embossed image. Thus, embossable layer 16 will retain any impression formed therein. According to the present invention, embossable layer 16 comprises more than one portion, called panels, such as, for example, panel 20 and panel 22. Each one of panels 20 and 22 is comprised of the pixels forming embossable layer 16. Each one of panels 20 and 22 is embossed to reflect incoming light only at a certain predetermined angle. Alternatively, panels 20 and 22 are comprised of the pixels that reflect light at predetermined angles; the angle at which the pixels of panel 20 are recorded is different from that at which the pixels on panel 22 are recorded. In other words, each of the panels of embossable layer 16 is either embossed or digitally recorded at a different angle.

Figure 2:
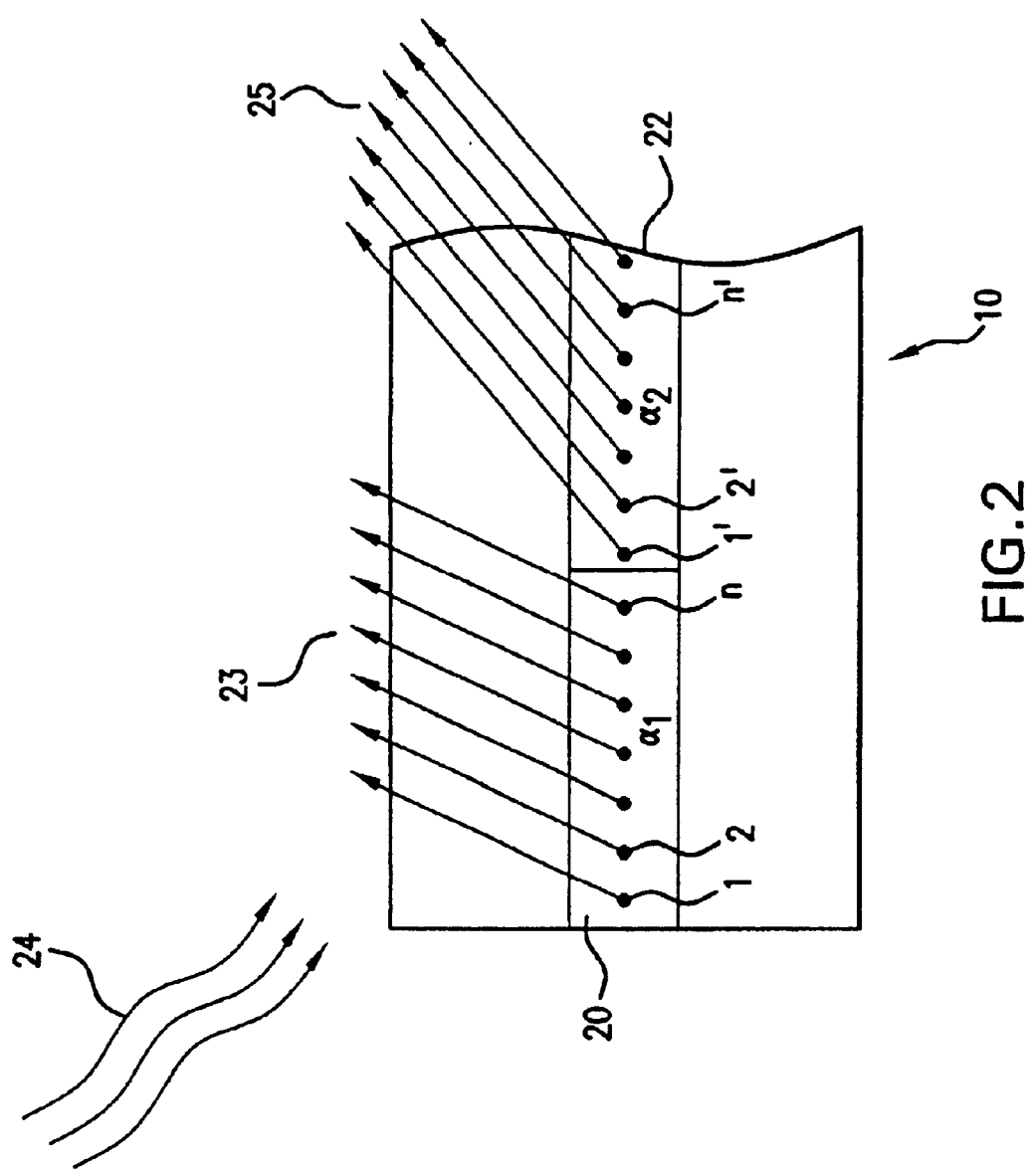
FIG. 2 is a cross-sectional view of two panels embossed according to the present invention.

FIG. 2 illustrates the concept of the embossable panels of the present invention in more detail. Illustrated there is transfer holographic or optically variable material 10 having embossable layer 16 comprising panel 20 adjacent to consecutive panel 22. Embossed in panel 20 are a plurality of pixels (shown as 1 to n for the purposes of convenient illustration) recorded to reflect incoming light 24 at angle $\alpha_1$. (As a matter of terminology, it should be understood that each pixel, whether embossed or digitally recorded, comprises a diffraction grating of a certain pitch and orientation. Incoming light 24 illuminates the pixels and diffracts on them. Light diffracting on pixels 1 to n in panel 20 becomes diffracted outgoing light at angle $\alpha_1$ (shown as light 23 in FIG. 2). Throughout this description the outgoing light (as light 23 and 25 in FIG. 2) is called "reflected" or "diffracted".) To rephrase, all pixels embossed in panel 20 of embossable layer 16 reflect incoming light at the same angle $\alpha_1$, meaning that the whole area of panel 20 is assigned an angle, $\alpha_1$, at which all the pixels disposed in panel 20 reflect incoming light 24. In a similar fashion, embossed in panel 22 are a plurality of pixels (shown as 1" to m" for the purposes of convenient illustration, m" can be equal to n or it can be different from n) recorded to reflect incoming light 24 at angle $\alpha_2$. All pixels embossed in panel 22 of embossable layer 16 reflect incoming light at the same angle $\alpha_2$, meaning that the whole area of panel 22 is assigned an angle, $\alpha_2$, at which all the pixels disposed in panel 20 reflect incoming light 24. Alternatively to digitally creating panels 20 and 22 in a pixel-by-pixel manner, each panel can comprise an embossment of a certain predetermined holographic or optically variable reflecting angle provided by any conventional holographic embossing method. Holographic transfer material 10 can comprise as many such panels embossed (or recorded) and reflecting light at different angles as it may be called for by a particular application.

Turning again to FIG. 1, a semi-transparent reflective layer 17 is deposited onto the embossable layer 16. As mentioned previously, the semi-transparent reflective layer allows a reader to view the embossed panels of the embossable layer when the panels are illuminated at a predetermined angle. A customized image on substrate 11 formed by transferring pixels in a selective pixel-by-pixel manner from the panels onto the substrate will also be viewable. Semi-transparent or opaque layer 17 preferably comprises ZnS or Al applied by any means suitable for such application.

A tie or primer layer 18 may be applied over reflective layer 17 to increase interfacial adhesion. The tie or primer layer can be made of any chemical composition which increases the interfacial adhesion between the reflective layer and the adhesive. A heat activated adhesive layer 13 is applied on top of tie layer 18. When heat, such as the heat from a thermal printer print head, is applied to material 10, the release layer 14 releases the coatings from the PET carrier 12 and the adhesive in adhesive layer 13 is activated, attaching material 10 to substrate 11. Substrate 11 can be made of paper teslin or plastic.

Figure 3:
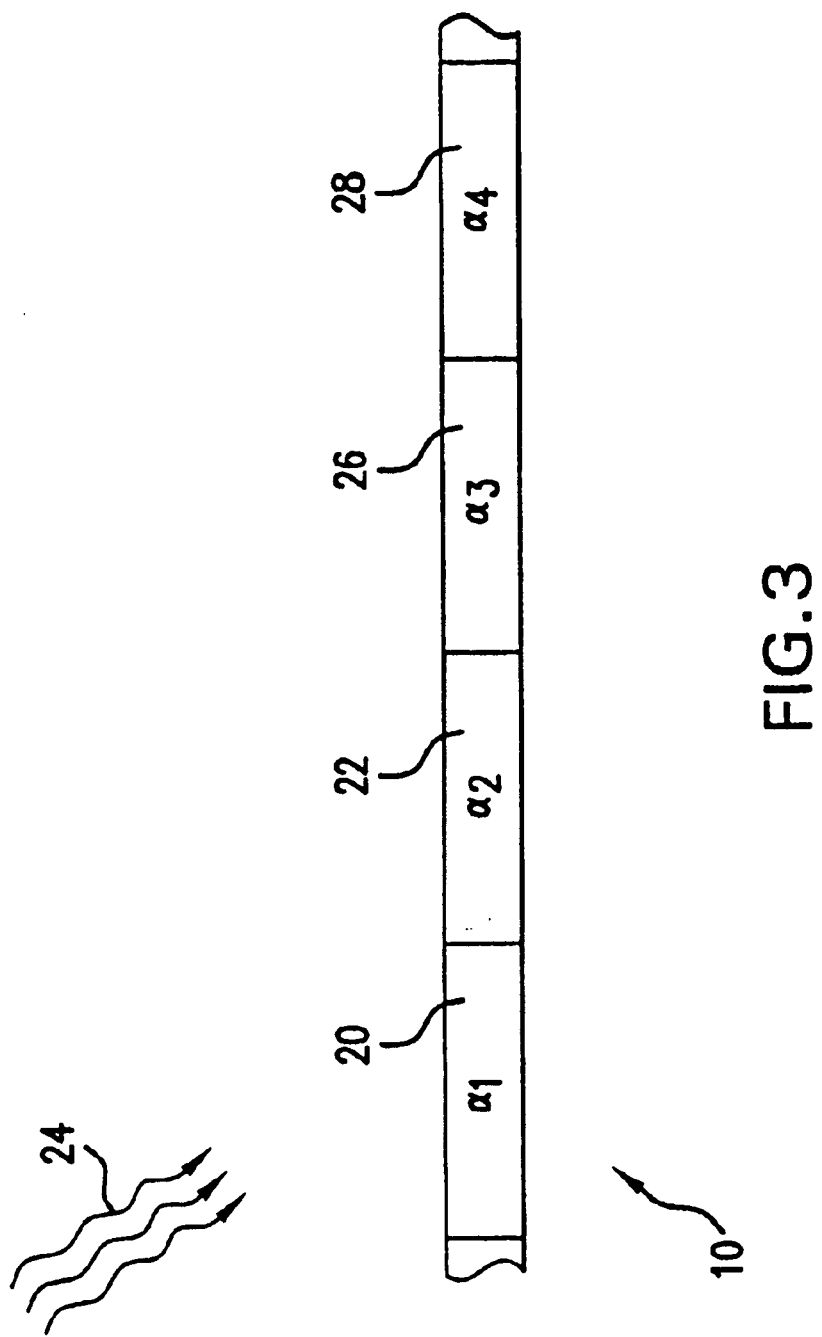
FIG. 3 is a schematic view of a ribbon embodiment of the present invention.

One of the embodiments of holographic or optically variable transfer material 10 according to the present invention is illustrated in FIG. 3. Material 10 is depicted in the form of a ribbon, similar to the shape of the ribbons used in thermal ink printing. The illustrative ribbon comprises holographic or optically variable panels 20, 22, 26, and 28 provided as described with regard to FIGS. 1 and 2. In particular, panel 20 is a portion of the embossable layer of material 10 comprising only the embossing (or pixels) reflecting incoming light 24 at angle $\alpha_1$. Panel 22 is a portion of the embossable layer of material 10 comprising only the embossing (or pixels) reflecting incoming light 24 at angle $\alpha_2$. Panel 26 is a portion of the embossable layer of material 10 comprising only the embossing (or pixels) reflecting incoming light 24 at angle $\alpha_3$. Panel 28 is a portion of the embossable layer of material 10 comprising only the embossing (or pixels) reflecting incoming light 24 at angle $\alpha_4$. Material 10 can have as many panels as may be desirable. Generally speaking, an embossing (or all pixels in a digital case) disposed within a particular panel are configured to reflect incoming light at a predetermined angle of reflection $\alpha_n$. As a result, the embossable layer becomes a multi-panel arrangement wherein each panel comprises the embossing (or the pixels embossed) to reflect incoming light at a certain angle, which is different from the angles of reflection of the embossings (or pixels) in other panels. The ribbon shown in FIG. 3 can comprise as many panels recorded at different angles as may be called for by a particular holographic or optically variable image that is desired to be custom printed on a substrate.

It should be noted that the number of pixels contained in a panel, or transferred onto the substrate), as well as the spectrum of various reflective angles, is directly related to the resolution of the resulting holographic or optically variable image and, ultimately, will need to have a reading device to read the image in case the resolution is too high or the difference between the angles are too close for a human eye to detect.

It is provided by the present invention that since each panel is characterized by an individual diffraction angle, each such panel can be assigned a number. For example, four panels 20, 22, 26 and 28 in FIG. 3, characterized by the respective angles of reflection $\alpha_1$, $\alpha_2$, $\alpha_3$, $\alpha_4$, can be assigned (or coded as) four predetermined numbers. In essence, four panels correspond to four angles of diffraction and to four coded numbers. The number of panels "4" here is completely arbitrary, it can be any number of the diffraction angles to infinity but usually 256 to correspond to the "gray scale" system used by design software like Coral draw and Photoshop.

Figure 4:
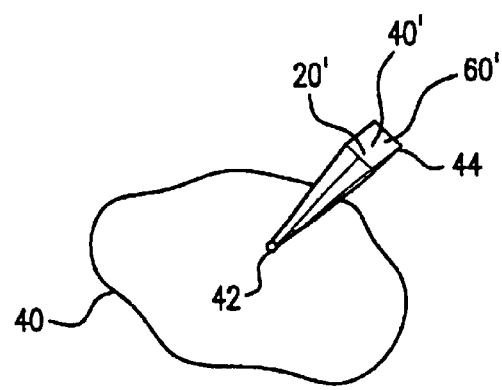
FIG. 4 is a schematic illustration of a specific ID zone in an image.

If a holographic or optically variable printing ribbon 10 in FIG. 4 is used to create a customized image on a substrate, then the image will comprise pixels diffracting at up to 4 different angles $\alpha_1$, $\alpha_2$, $\alpha_3$, $\alpha_4$. If the values of $\alpha_1$, $\alpha_2$, $\alpha_3$, $\alpha_4$ are far enough apart (for example, 40°, 100°, 180° and 320°, a human eye will easily be able to detect and visually confirm the four different colors comprising the image). If the values of the diffraction angles are close to each other (which can happen if the difference between only several recorded angles is small or if the number of different diffraction angles is large, up to 256, which makes the angular difference between the angles very small), the human eye will not be able to detect different colors and a dedicated reader will be required to verify the angles. If a reading device is used, the reader can detect any number of diffraction angles corresponding to pixels comprising the image. If the numbers are assigned to each diffraction angle, the reader device scans the image, reads (detects) and identifies the diffraction angles corresponding to the pixels in the image and outputs the sequence of numbers corresponding to the scanned image. A particular sequence of numbers corresponding to the diffraction angles can be coded as the ribbon's serial number corresponding to the holographic printing material which was used to print the holographic or optically variable image. A particular sequence of numbers corresponding to a block of pixels in an image can also be coded as a security measure to verify the authenticity of a document and significantly reduce the possibility of counterfeiting. An identification mechanism (corresponding to the reader) can be incorporated into the ID card or document issuance machine so that this printer will only accept the predetermined or "serialized" ribbon. Thus, having a particular serial number (coded based on the numbers assigned to holographic panels), will also allow an investigator to know which printer was used to print a particular image and thus verify a document's authenticity using the external reader.

It is now possible to see how the holographic or optically variable printing material can be used to ascertain the authenticity of a document or an ID card. A holographic or optically variable printing material, such as a ribbon, with multiple panels characterized by the known diffraction angles and their respective assigned numbers is used to print an image in a pixel-by-pixel fashion on a desired substrate. Each image created by the described technique can have a specific ID zone, which is a block of pixels diffracting at the known (or designated) angles. The numbers corresponding to the known angles in the ID card can be scanned by the reading device and if the numbers match the known numbers for that ID zone, the authenticity of a document can be verified. For example, as schematically shown in FIG. 4, a holographic image 40 has an ID zone 42, which is also shown as an exploded view 44. The three pixels shown in exploded view 44 have diffraction angles 20°, 40°, and 60°, respectively. If those diffraction angles are assigned three numbers, the reader scanning the image at ID zone 42 will detect the angles and the corresponding numbers. If the sequence of numbers matches that of a genuine document or ID card, the authenticity can verified.

Figure 5:
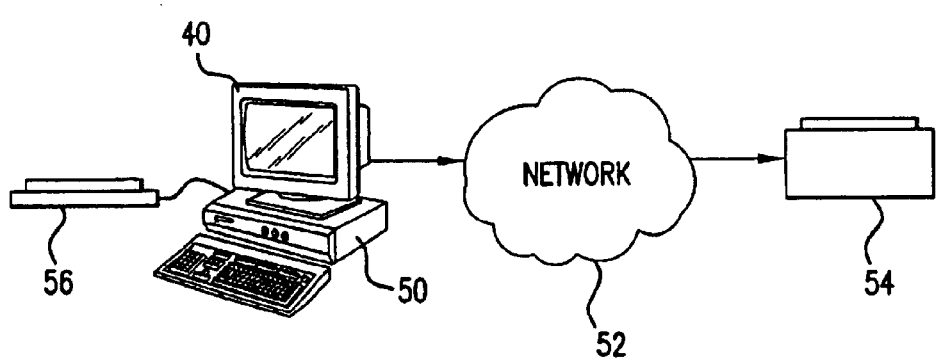
FIG. 5 is a schematic illustration of a customized printing arrangement.

Holographic or optically variable images can be printed on a substrate using the holographic or optically variable printing materials of the present invention and can be designed using any typical known design software. After an image is designed in a digital format using the software, the image can be sent to a printer. Any conventional dye diffusion card printer (for example, Datacard, Fargo, Eltron, Atlantek, Kanematsu etc) can be used with the holographic or optically variable ribbon to print the image on a substrate. It is also contemplated that the printer with the holographic or optically variable printing material does not have to be in the same facility where the holographic image is designed. The image can be printed at a remote location where it can be sent to over the Internet, on a disk or transmitted by any other means. For example, as illustrated in FIG. 5, holographic or optically variable image 40 can be digitally designed pixel-by-pixel on computer 50. In a digitized design, it is specified that each pixel of image 40 will diffract incoming light at a predetermined angle. Then image 40 can be printed on a local (or LAN) printer 56 using the holographic printing material of the present invention, or sent over a network 52, such as the Internet, or shipped by other means, such as on a hard disk, to a remote location for printing on printer 54. An example of such a remote location printing of image 40 could be a Department of Motor Vehicles or any other issuing or integration entity.

A method of forming a holographic or optically variable image on a substrate comprises the following. A multilayer holographic or optically variable transfer material, which can be a ribbon or can have any other suitable shape and size, is provided as described above with regard to FIGS. 1–3. The holographic or optically variable image desired to be formed, or printed, on the substrate can be described as a number of pixels which form that image. In other words, the holographic or optically variable image is comprised of the image forming pixels. When a certain holographic image is being formed, or printed, on the substrate, each image forming pixel is transferred in a selective pixel transferring manner from the panel with the appropriate embossing (or in which such a pixel is disposed) to the substrate. As an illustration of the above-described method, the desired holographic or optically variable image can be formed by a pixel-by-pixel transfer process. Preferably, all the image forming pixels reflecting at the angle of reflection $\alpha_1$ are transferred from a corresponding panel with the $\alpha_1$ embossment. All the image forming pixels reflecting at the angle $\alpha_2$ are transferred from a corresponding panel with the $\alpha_2$ embossment and so on. In other words, when the holographic or optically variable image is being formed on the substrate, all of the image forming pixels from one panel can be transferred onto the substrate as a first step, then all of the image forming pixels from another panel can be transferred to the substrate and so on, depending on how many pixels of different reflecting angles are necessary for form a particular holographic or optically variable image. The pixel transfer process can be activated by heat, such as the heat generated by a thermal printer head.

For example, to produce the holographic or optically variable printing material in accordance with the present invention, each individual panel is recorded pixel-by-pixel using the same diffraction angle for all pixels using high-resolution format, for example 1200 dpi. The resulting panel would be of a size of a typical dye diffusion ribbon panel and have about 8,000,000 to 9,000,000 pixels of the same diffraction angle in each panel. It should be noted that the resolution and the number of pixels per panel listed above are only an example of a possible panel, the resolution and the total number of pixels can vary depending on a type of document or substrate material or a particular application. The recorded panel is then embossed or cast into a coating that later is transferred pixel-by-pixel onto a substrate, such as a surface of an ID document by printing (issuing). The transfer of the pixels occurs in a pixel-by-pixel fashion under the heat and pressure from the print head at a lower resolution of between 200 and 500 dpi (for example, from the thermal print head), similarly to the technology currently employed by the card industry printing with dye diffusion ribbons. At the end, each printer would print at least 3 to 6 of the 1200 dpi pixels for each of the 200 to 500 dpi pixels of the resulting thermally printed image.

As it has already been described above, a computer can be provided to control the process of forming a holographic or optically variable image on a desired substrate. For example, the issuer can review the holographic or optically variable security image template on the computer display, add specific individual personal information to the template and then send the highly customized image from the computer to a holographic or optically variable printer (locally or remotely) to print the newly customized image on the desired substrate in accordance with the method described above. A highly customized holographic or optically variable image can be printed onto a desirable substrate, such as a paper or plastic document.

In order to provide holographic or optically variable transfer material 10 of the type described with regard to FIGS. 1–3, the consecutive panels should be formed in embossable layer 16 of the material. It would be suitable to utilize any known method to emboss the panels in the embossable layer, or to digitally provide each pixel in a panel configured to reflect at a desired angle, as long as all pixels within the same panel are recorded to reflect at the same angel, or as long as the whole embossing in a holographically or optically variably created panel reflects incoming light at the same predetermined angle.

What is claimed is:

1. A material for forming a customized holographic or optically variable image on a substrate, the material comprising:
    a plurality of layers comprising a thermally stable layer, a wear resistant layer or top coat, an embossable layer, a reflective layer overlaid upon the embossable layer and a heat activated adhesive layer serving to attach the material to the substrate upon heat activation;
    the embossable layer comprising a plurality of embossed consecutive panels, each panel being holographically or optically variably configured to reflect incoming light at a predetermined holographic or optically variable reflection angle $\alpha_n$, which predetermined angle $\alpha_n$ is different for each panel.

2. The material of claim 1, wherein each holographically or optically variably configured panel comprises an embossment of the predetermined holographic or optically variable reflection angle $\alpha_n$, resulting in a multi-panel arrangement wherein each panel is embossed to reflect incoming light at the predetermined holographic or optically variable angle $\alpha_n$, which angle $\alpha_n$ is different from the angles of reflection of the embossings in other panels.

3. The material of claim 1, wherein each holographically or optically variably configured panel comprises a plurality of pixels embossed in such a way that all pixels disposed within the same panel reflect incoming light at a predetermined angle of reflection $\alpha_n$, resulting in a multi-panel arrangement wherein each panel comprises pixels embossed to reflect incoming light at an angle different from the angles of reflection of the pixels in other panels.

4. The material of claim 1, further comprising a release layer overlaid upon the
thermally stable layer, and a tie layer overlaid upon the heat activated adhesive layer.

5. The material of claim 1 provided in the form of a ribbon.

6. The material of claim 1, wherein each angle $\alpha_n$ corresponds to a predetermined number.

7. The material of claim 6, wherein a plurality of angles $\alpha_n$ ($n \leq 256$) correspond to a plurality of predetermined numbers forming a sequence of numbers.

8. The material of claim 7, wherein the sequence is utilized in a reading device which is programmed to operate only with a holographic or optically variable material associated with the sequence.

9. A method of forming a holographic or optically variable image on a substrate, the image being comprised of image forming pixels, the method comprising:
providing a transfer material having an embossable layer comprising a plurality of consecutive panels, each panel being holographically or optically variably configured to reflect incoming light at a predetermined holographic or optically variable reflection angle $\alpha_n$, which predetermined angle $\alpha_n$ is different for each panel; and
forming the holographic or optically variable image on the substrate by selective pixel transferring of the image forming pixels from at least one panel onto the substrate.

10. The method of claim 9, further comprising providing a computer storing the holographic or optically variable image, the computer controlling selective pixel transferring of the image forming pixels from the transfer material to the substrate to form the holographic image.

11. The method of claim 9, wherein selective pixel transferring comprises pixel-by-pixel transferring.

12. The method of claim 9, wherein each holographically or optically variably configured panel comprises an embossment of the predetermined holographic or optically variable reflection angle $\alpha_n$, resulting in a multi-panel arrangement wherein each panel is embossed to reflect incoming light at the predetermined holographic angle $\alpha_n$, which angle $\alpha_n$ is different from the angles of reflection of the embossings in other panels.

13. The method of claim 9, wherein each holographically or optically variably configured panel comprises a plurality of pixels embossed in such a way that all pixels disposed within the same panel reflect incoming light at a predetermined angle of reflection $\alpha_n$, resulting in a multi-panel arrangement wherein each panel comprises pixels embossed to reflect incoming light at an angle different from the angles of reflection of the pixels in other panels.

14. The method of claim 9, wherein forming the holographic or optically variable image comprises designing the image by means of a computer program.

15. The method of claim 9, wherein selective pixel transferring comprises heat activating of each pixel of the image forming pixels and causing each pixel to separate from the transfer material and to adhere to the substrate.

16. The method of claim 15, wherein heat activating of each pixel comprises acting upon each panel by a printer head.

17. The method of claim 16, wherein selective pixel transferring comprises pixel-by-pixel transferring.

18. The method of claim 9, wherein forming the holographic or optically variable image comprises printing the image to a local or remote printer.

19. The method of claim 18, wherein the image is send to the local or remote printer via the Internet.

* * * * *